United States Patent
Iwahara et al.

(10) Patent No.: US 6,266,207 B1
(45) Date of Patent: Jul. 24, 2001

(54) SOUND REDUCING COVER SEAL FOR INFORMATION RECORDING APPARATUS

(75) Inventors: Hiroyuki Iwahara; Keiji Aruga, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/127,215

(22) Filed: Jul. 31, 1998

(30) Foreign Application Priority Data

Feb. 10, 1998 (JP) ................................ 10-028155

(51) Int. Cl.[7] ............................................. G11B 33/14
(52) U.S. Cl. .......................................... 360/97.02
(58) Field of Search ........................ 360/97.02; 428/344

(56) References Cited

U.S. PATENT DOCUMENTS

| | | | |
|---|---|---|---|
| 3,325,589 | * | 6/1967 | Mildner . |
| 4,292,463 | * | 9/1981 | Bow et al. . |
| 4,699,838 | * | 10/1987 | Gilbert . |
| 5,021,905 | * | 6/1991 | Sieger ................. 360/97.02 |
| 5,214,549 | * | 5/1993 | Baker et al. ......... 360/97.02 |
| 5,270,887 | * | 12/1993 | Edwards et al. ..... 360/97.01 |
| 5,276,577 | * | 1/1994 | Brooks et al. ....... 360/97.02 |
| 5,282,100 | * | 1/1994 | Tacklind et al. .... 360/97.02 |
| 5,600,509 | * | 2/1997 | Kawakami ........... 360/97.02 |
| 5,761,184 | * | 6/1998 | Dauber et al. ....... 360/97.02 |
| 5,781,373 | * | 7/1998 | Larson et al. ........ 360/97.02 |
| 5,793,566 | * | 8/1998 | Scura et al. .......... 360/97.02 |

\* cited by examiner

*Primary Examiner*—Craig A. Renner
(74) *Attorney, Agent, or Firm*—Greer, Burns & Crain, Ltd.

(57) ABSTRACT

A cover seal seals an opening of a housing body and encloses a cover for the opening in cooperation with the housing body. The rigidity of the cover seal is reinforced by a metallic sheet or a multiplayer synthetic resin sheet, so that vibration of the cover seal is prevented even if air stream in a seam between the housing body and cover acts on the cover seal from the behind.

7 Claims, 3 Drawing Sheets

SOUND REDUCING COVER SEAL FOR INFORMATION RECORDING APPARATUS

BACKGROUND OF THE INVENTION

1. Field of the Invention

The present invention relates to an information recording apparatus such as a hard disk drive unit (HDD), and more particularly, to a cover seal covering over a seam provided between an edge around an opening of a housing and a cover for closing the opening.

The term "seam" is referred to in this specification as a portion between the edge and the cover, with or without a gap therebetween.

2. Description of the Prior Art

It is well known that an HDD employs a cover of a vibration suppression metallic plate so as to reduce noise during reading/writing operation for data. The cover is coupled to a housing body of a box-shape in the HDD for providing a housing. The housing of this type may contribute to reduction in noise by the effect of the vibration suppression metallic plate.

A housing of an HDD should air-tightly enclose a magnetic disk and a magnetic head. For example, in case where a housing is comprised of a pair of members such as a box-shaped housing body and a cover of a vibration suppression metallic plate, a cover seal is adhered to air-tightly close the opening of the housing body. The housing body and cover seal serve to enclose the cover, so that a seam between the housing body and cover is sealed. Since the cover seal can contribute to cost reduction as compared with a packing, the cover seal comes to take the place of the packing as a seal member.

The present inventors have discovered that air flows in the seam between the housing body and cover so that the air causes the cover seal to vibrate during reading/writing operation for data. The present inventors have confirmed that the vibration of the cover seal takes part in noise of the HDD.

SUMMARY OF THE INVENTION

It is accordingly an object of the present invention to provide a cover seal for an information recording apparatus capable of reducing noise of the apparatus.

According to a first aspect of the present invention, there is provided a cover seal comprising: a metallic sheet; and an adhesive layer formed on a side face of the sheet for adhering the sheet on a housing for an information recording apparatus.

The rigidity of the cover seal may be reinforced by the metallic sheet, so that the cover seal can be prevented from vibrating. Accordingly, noise caused by vibration of the cover seal can be reduced. The metallic sheet of the cover seal may be covered with a protection layer of a synthetic resin.

The cover seal is employed in an information recording apparatus. The information recording apparatus may comprise a housing body accommodating at least a recording disk and a head, and a cover plate closing an opening of the housing. The metallic sheet of the cover seal preferably covers over at least a seam between an edge around the opening and the cover. The adhesive layer of the cover seal serves to adhere the metallic sheet on the edge and a surface of the cover. Accordingly, even if air stream in the seam acts on the cover seal from the back, the cover seal can be prevented from vibrating, so that the generation of noise can be suppressed. The cover seal may cover all over the cover so as to enclose the cover in the housing body and the cover seal itself.

According to a second aspect of the present invention, there is provided a cover seal comprising: a multilayer synthetic resin sheet having an interposed adhesive layer; and an adhesive layer formed on a side face of the sheet for adhering the sheet on a housing for an information recording apparatus. The multilayer structure may reinforce the rigidity of the cover seal, so that the same effect as the first aspect can also be achieved.

It should be noted that an information recording apparatus employing the cover seal according to the first or/and second aspect may be installed in a computer apparatus, or may be constructed as a stand-alone exterior recording apparatus.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
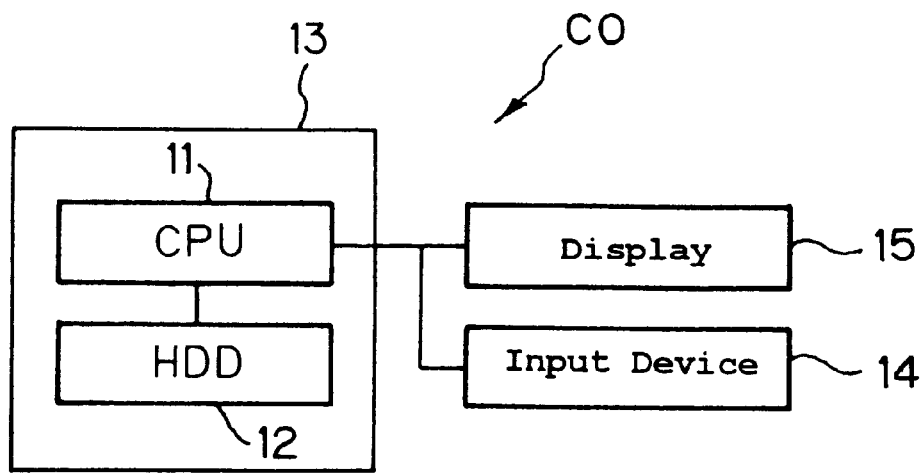
FIG. 1 is a block diagram schematically illustrating the structure of a computer apparatus.

FIG. 1 schematically illustrates the structure of a computer apparatus CO. The computer apparatus CO comprises a computer unit 13 assembled with a central processing unit (CPU) 11, and a hard disk drive unit (HDD) 12 as an information recording apparatus of the present invention. The CPU 11 is capable of sending and receiving information data to and from the HDD 12 in accordance with instructions input from an input device 14, such as a keyboard and/or a mouse, which is connected to the computer unit 13. The information data may be displayed on a screen of a display device 15 which is connected to the computer unit 13.

Figure 2:
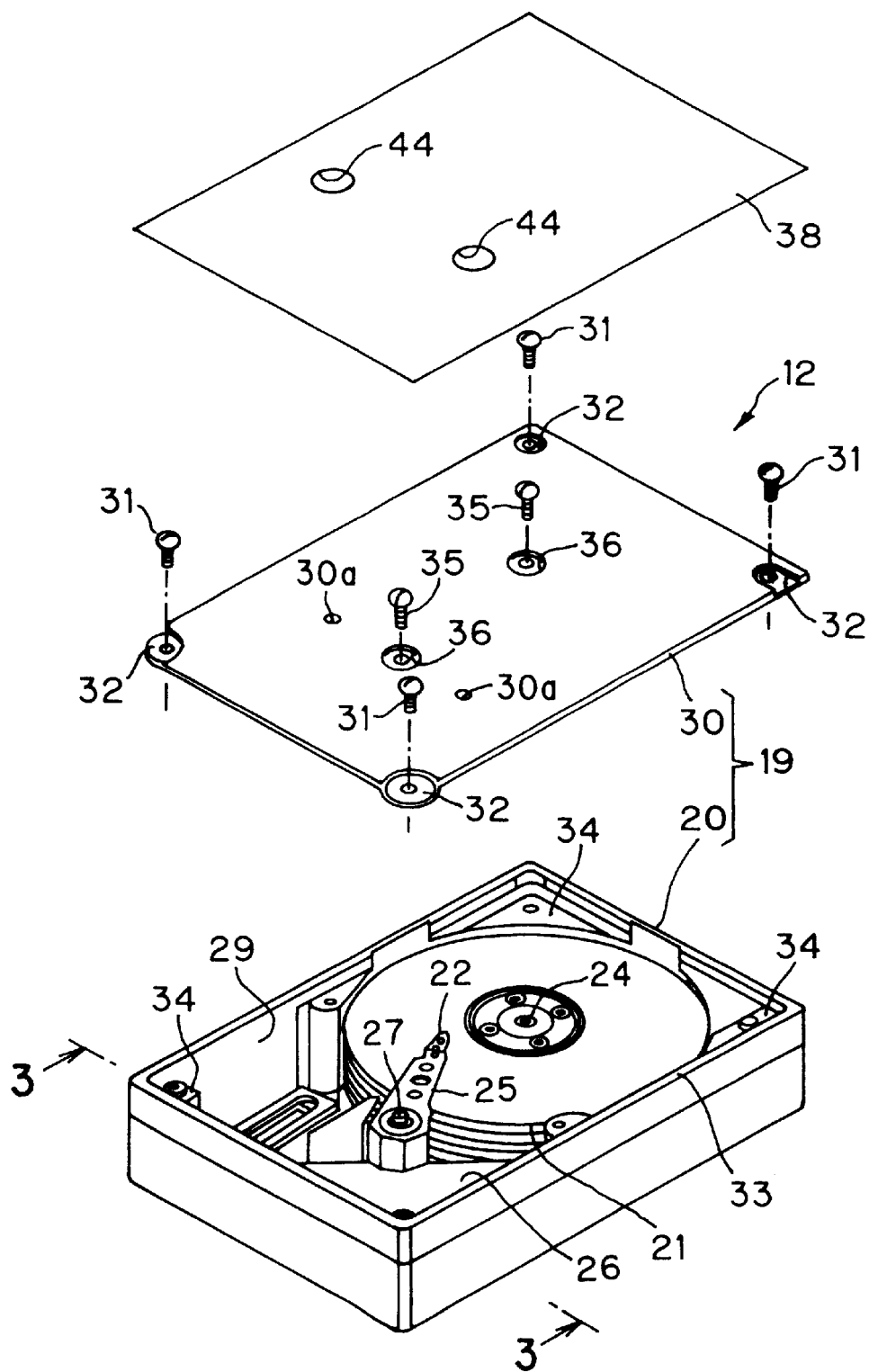
FIG. 2 is an exploded perspective view of a hard disk drive unit (HDD)

FIG. 2 illustrates an exploded perspective view of the HDD 12. As shown in FIG. 2, the HDD 12 comprises a box-shaped housing body 20 as a member of a housing 19. The housing body 20 is for example formed by aluminum die-casting into a box-shape so as to have a high rigidity.

The housing body 20 accommodates a plurality of magnetic disks 21 as recording media for recording information data, and magnetic heads 22 as reading/writing means opposed to the disk surfaces of the respective recording disks 21. The recording disks 21 may rotate about a rotation axis 24 fixed to the housing body 20. The rotation of the disks 21 is driven by a spindle motor, not shown. A carriage 25, with the magnetic head 22 at the tip end, may swing about a carriage axis 27 fixed to the housing body 20. The swinging movement of the carriage 25 is caused by a magnetic circuit 26 comprising an actuator. The magnetic heads 22 are positioned to a target recording track and block through the rotation of the disks 21 and the swinging movement of the carriage 25.

A cover plate 30 closes a housing opening 29 of the housing body 20. The cover 30 is coupled to the housing body 20, by screws 31 positioned at four corners of the cover 30, so as to form the housing 19. Screw receiving recesses 32 are formed at the corners of the cover 30 so as to prevent the heads of the screws 31 from protruding from the level of the surface of the cover 30. Steps 34 are formed on the housing body 20 inside a housing edge 33 at the corners for receiving the screw receiving recesses 32 of the cover 30. When the steps 34 receive the screw receiving recesses 32, the surface of the cover 30 is leveled with the housing edge 33. Moreover, the heads of the screws 31 are prevented from protruding from the surface of the cover 30.

When the cover 30 is coupled to the housing body 20, two connecting screws 35 are screwed into the tip ends of the rotation axis 24 and the carriage axis 27. Connecting screw receiving recesses 36 are formed in the cover 30 so as to prevent the heads of the connecting screws 35 from protruding from the level of the surface of the cover 30.

The cover 30 may be formed by a press from an aluminum plate or a vibration suppression metallic plate. The press shapes the screw receiving recesses 32 and the connecting screw receiving recesses 36 on the cover 30. The vibration suppression metallic plate may be a VEM comprising a vibration suppression material layer such as synthetic resin layer interposed between a pair of steel sheets.

Figure 3:
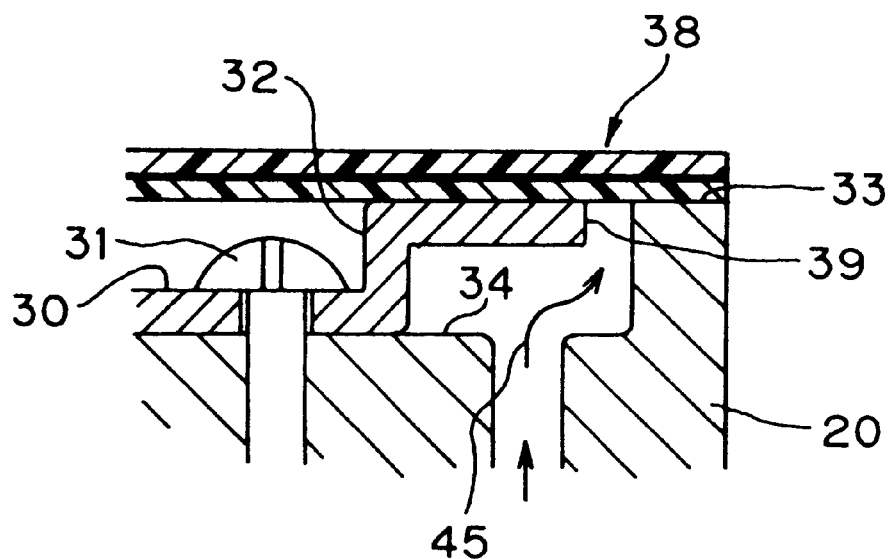
FIG. 3 is an enlarged partial view illustrating the section taken along the line 3—3 in FIG. 2.

When the attachment of the cover 30 is completed, a cover seal 38 is adhered to the outer surface of the housing 19. The cover seal 38 not only covers all over the surface of the cover 30 as is apparent from FIG. 2 but also extends to the edge 33 of the housing body 20 as shown in FIG. 3. Accordingly, a seam 39 between the edge 33 and the cover 30 is air-tightly sealed by the cover seal 38. When the cover seal 38 is adhered all along the edge 33, the cover 30 is enclosed in the cover seal 38 and the housing body 20. The heads of the screws 31 in the screw receiving recesses 32 and the heads of the connecting screws 35 in the connecting screw receiving recesses 36 are positioned inside the cover seal 38.

Figure 4:
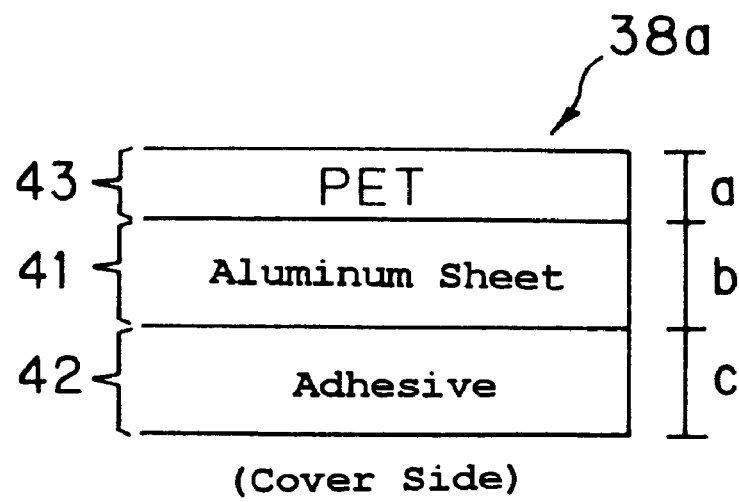
FIG. 4 illustrates the structure of a cover seal according to a first embodiment of the present invention.

FIG. 4 illustrates the structure of a cover seal 38a according to a first embodiment of the present invention. The cover seal 38a comprises a metallic sheet 41 and an adhesive layer 42 formed on a rear face of the sheet 41. The metallic sheet 41 may have rigidity enough to keep its shape by itself. The sheet 41 is for example made of an aluminum film or a copper film. The adhesive layer 42 serves to adhere the metallic sheet 41 on the cover 30 and the edge 33 of the housing body 20. A PET (polyethylene terephthalate) protection layer 43 is formed on the front face of the metallic sheet 41 as a protection layer of a synthetic resin. The protection layer may be made from other synthetic resin in place of PET.

Assume that air stream 45 flows in the seam 39 between the housing body 20 and the cover 30 shown in FIG. 3. The air stream 45 acts on the rear surface of the cover seal 38. However, the cover seal 38 reinforced by the rigidity of the aluminum or metallic sheet 41 is prevented from vibrating, so that noise transmitted to the outside can be reduced. According to an experiment managed by the present inventors, the employment of the cover seal 38a achieves the noise level of 39 dB, while a conventional cover seal comprising a PET layer of 50 micrometers thickness and an adhesive layer of 30 micrometers thickness achieves the noise level of 41 dB. The cover seal 38a in the experiment has an aluminum or metallic sheet 41 with thickness b=50 micrometers, an adhesive layer 42 with thickness c=50 micrometers, and a PET protection layer 43 with thickness a=28 micrometers, as shown in FIG. 4. The PET protection layer includes an adhesive layer of 5 micrometers for adhering the PET protection layer 43 to the aluminum or metallic sheet 41.

The description will be made for a manufacture process of the cover seal 38a referring to FIG. 4. First of all, an aluminum sheet 41 is prepared and predetermined characters may be printed on a surface of the sheet 41. An adhesive and a PET sheet are then placed on the printed surface of the sheet 41. When heat and pressure are applied with a heat roller to the printed surface, a PET protection layer 43 is formed on the sheet 41. An adhesive layer 42 is then applied to the rear surface of the sheet 41 by using a roller or the like. A peel sheet is attached to the rear surface over the applied adhesive layer 42. The cover seal 38a can be punched out of the sheet 41. In use, the peel sheet is peeled off and the cover seal 38a is placed on a surface of the housing 19 with the adhesive layer 42 facing the surface.

As shown in FIG. 2, an inspection hole 44 may be bored in the cover seal 38a. A communication hole 30a is formed in the cover 30 corresponding to the inspection hole 44. These inspection hole 44 and communication hole 30a can be used when the air-tightness of the housing 19 is examined. Specifically, the examination can be conducted by first blowing air into the housing 19 through the inspection hole 44 and communication hole 30a and then detecting a leakage of air from the periphery of the cover 30 and the vicinity of the screws 31 and the connecting screws 35. The communication hole 30a may be sealed by a seal member after the examination. The examination may be conducted during or after the assembling process of the HDD 12.

Figure 5:
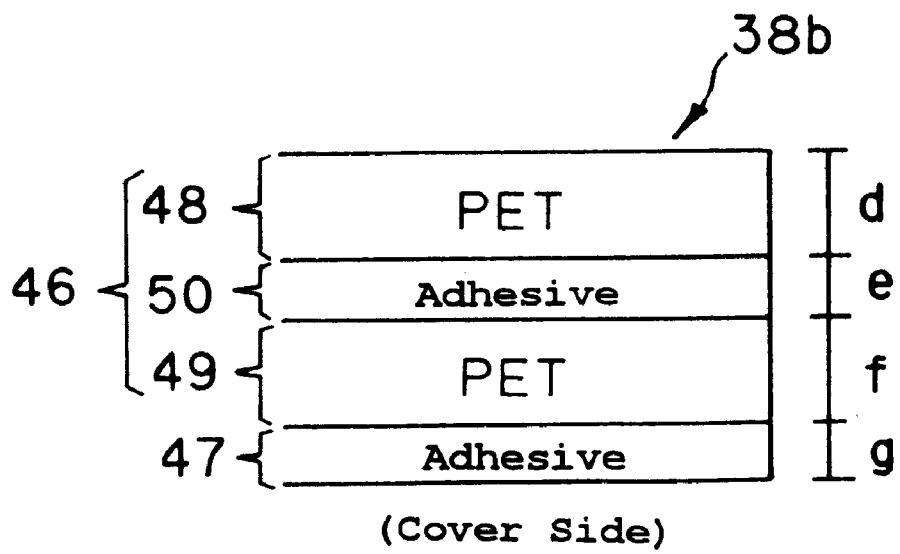
FIG. 5 illustrates the structure of a cover seal according to a second embodiment of the present invention.

FIG. 5 illustrates the structure of a cover seal 38b according to a second embodiment of the present invention. The cover seal 38b comprises a multilayer synthetic resin sheet 46 and an adhesive layer 47 formed on a rear surface of the synthetic resin sheet 46. The rigidity of the synthetic resin sheet 46 is reinforced by a pile of first and second synthetic resin sheets 48, 49 with an adhesive layer 50 interposed therebetween. The first and second synthetic resin sheet 48, 49 may be made from PET material. The adhesive layer 47 serves to adhere the multilayer synthetic resin sheet 46 on the cover 30 and the edge 33 of the housing body 20.

According to an experiment managed by the present inventors, the employment of the cover seal 38b achieves the noise level of 40 dB, while a conventional cover seal comprising a PET layer of 50 micrometers thickness and an adhesive layer of 30 micrometers thickness achieves the noise level of 41 dB. The cover seal 38b in the experiment has a first synthetic resin sheet 48 with thickness d=50 micrometers, a second synthetic resin sheet 49 with thickness f=50 micrometers, an adhesive layer 50 with thickness e=30 micrometers, and an adhesive layer 47 with thickness g=30 micrometers.

What is claimed is:

1. An information recording apparatus comprising:
   a housing body accommodating at least a recording disk and a bead;
   a cover plate closing an opening of the housing body;
   a metallic sheet covering over at least a seam between an edge of the opening and the cover plate;
   an adhesive layer formed on a side face of the sheet for adhering the sheet on the edge and a surface of the cover plate; and
   a protection layer of a synthetic resin adhesively covering over the other side face of the sheet.

2. The information recording apparatus according to claim 1 wherein the edge is formed on the housing body so as to surround the opening at a predetermined level.

3. The information recording apparatus according to claim 2 further comprising a step formed on the housing body inside the edge.

4. The information recording apparatus according to claim 3 wherein the cover plate is received on the step so as to close the opening.

5. The information recording apparatus according to claim 4 wherein the metallic sheet covers over the edge at the predetermined level for accommodating the cover plate between the housing body and itself.

6. The information recording apparatus according to claim 1 wherein the seam between the edge of the opening and the cover plate is sealed as to be airtight.

7. The information recording apparatus according to claim 1, wherein the synthetic resin comprises polyethylene terephthalate (PET).

* * * * *

UNITED STATES PATENT AND TRADEMARK OFFICE
CERTIFICATE OF CORRECTION

PATENT NO. : 6,266,207 B1
DATED : July 24, 2001
INVENTOR(S) : Iwahara et al.

Page 1 of 1

It is certified that error appears in the above-identified patent and that said Letters Patent is hereby corrected as shown below:

<u>Title page,</u>
ABSTRACT,
Line 5, after "if" insert -- an -- thereto
Line 7, delete "the"

<u>Column 5,</u>
Line 9, delete "bead" and insert -- head -- therefor

Signed and Sealed this

Thirtieth Day of April, 2002

Attest:

Attesting Officer

JAMES E. ROGAN
*Director of the United States Patent and Trademark Office*